United States Patent [19]
Johnson et al.

[11] 3,772,156
[45] Nov. 13, 1973

[54] PURIFICATION OF ACETIC ACID STREAMS BY DISTILLATION

[75] Inventors: William R. Johnson; Thomas C. Singleton, both of Texas City, Tex.

[73] Assignee: Monsanto Company, St. Louis, Mo.

[22] Filed: Nov. 19, 1971

[21] Appl. No.: 200,553

[52] U.S. Cl.......................... 203/33, 203/34, 203/36, 203/37, 203/38, 203/81, 260/541
[51] Int. Cl.......................... B01d 3/34, C07c 51/44
[58] Field of Search ............................... 203/34 –37, 203/33, 38, 99, 74, 81, 16; 260/541

[56] References Cited
UNITED STATES PATENTS

| | | | |
|---|---|---|---|
| 3,490,997 | 1/1970 | Burney et al. .................... | 260/541 |
| 3,084,109 | 4/1963 | Ure et al. ........................... | 260/541 |
| 2,384,374 | 9/1945 | Harrison ............................ | 203/81 |
| 2,900,413 | 8/1959 | Stautzenberger et al. .......... | 260/541 |
| 3,196,176 | 7/1965 | Howell ............................... | 203/35 |

*Primary Examiner*—Wilbur L. Bascomb, Jr.
*Attorney*—Elizabeth F. Sporar et al.

[57] ABSTRACT

The purification of acetic acid to remove very minor amounts of iodine in the parts per billion range is effected by means of a two-column distillation of the acid containing such iodine contamination in the presence of a chemical agent which is either an alkali metal compound, an alkaline earth metal compound, or a mixture of either of these compounds with hypophosphorous acid.

9 Claims, 1 Drawing Figure

Patented Nov. 13, 1973
3,772,156
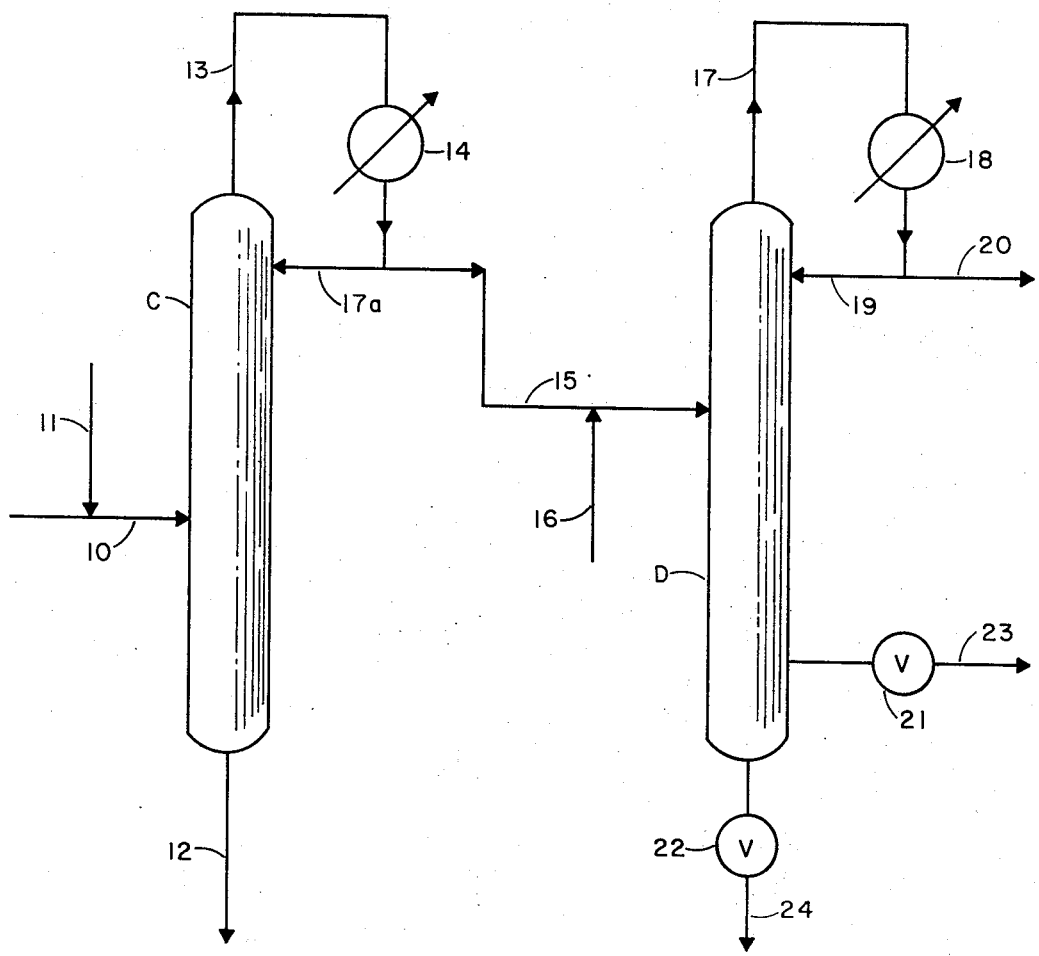
INVENTORS
Thomas C. Singleton
William R. Johnson
BY
Elizabeth F. Sporar
AGENT

PURIFICATION OF ACETIC ACID STREAMS BY DISTILLATION

BACKGROUND OF THE INVENTION

The present invention relates to the purification of carboxylic acid streams. More particularly, it relates to the purification of an acetic acid stream containing very minor amounts of iodine as an impurity.

A process has recently been developed for the preparation of carboxylic acids by the reaction of an alcohol or an ester, or ether and halide derivatives thereof, with carbon monoxide in contact with catalyst systems formed on mixing of a rhodium or iridium component and an iodine component in the presence of carbon monoxide. Hydrogen iodide or an alkyl iodide, notably methyl iodide, is usually employed as the iodine component in these catalyst systems. While the carboxylic acids produced by this process are generally of relatively high purity, they sometimes contain residual amounts of iodine either as ionic iodine, free iodine or as an alkyl iodide, especially methyl iodide. Such contaminants render the acids unfit for certain uses. For example, the acetic acid containing them cannot be employed in certain processes in which the catalyst used is sensitive to the presence of even trace amounts of iodine. In some instances, in order to be useful as a raw material acetic acid must contain 40 parts by weight of iodine or less per billion parts by weight of acid (40 ppb) and preferably less than 10 ppb.

Suitably pure carboxylic acids, that is, carboxylic acids containing less than 20 ppb iodine, can be produced by distillation techniques such as that described, for example, in copending application Ser. No. 31,179 filed April 23, 1970. This system involves introducing the acid stream containing the iodine contaminant into a first distillation column, taking a fraction from the upper half of the first distillation column and introducing it into the upper half of a second distillation column, removing a light overhead fraction containing primarily alkyl iodide from the second distillation column and removing a product stream at or near the bottom of the second distillation column, the product stream being virtually free of the iodine component. However, as distillation proceeds in such a system, there is a continuous generation of an iodine impurity. Frequent analysis of the feed material and the overhead product of the first distillation column shows that the total iodine content of the overhead is consistently greater than that observed in the feed. This effect is believed to be attributable primarily to solvolysis or hydrolysis of metal iodides such as those of nickel, iron, chromium and molybdenum which are present in the system as corrosion products as well as to hydrolysis of any alkyl iodides which may also be present. Also, because of the precise control required to maintain the iodine at the exceedingly low levels required by product specifications, an upset in any part of the purification system caused, for example, by the temperature going out of control or by inadvertent admission of air into a column, rapidly affects the whole system, resulting in the specifications at any particular point in the system with respect to iodine content being exceeded by as much as 10 to 100 times. In such cases, too, free iodine can be produced which causes undesirable discoloration in the acid stream.

Accordingly, it is an object of the present invention to provide a process for the purification of acetic acid whereby minor amounts of iodine or iodine-containing impurities may be removed to exceedingly low levels for consistent production of a product containing less than 40 ppb of iodine either as free iodine or ionic iodine ($I^-$) analyzed as total inorganic iodine or as alkyl iodide.

SUMMARY OF THE INVENTION

This and other objects and advantages of this invention which will become obvious from the following description thereof are realized in the purification process wherein a stream of acetic acid containing minor amounts of iodine either as $I^-$, free iodine or alkyl iodide, or all of these, is distilled in a first distillation column in the presence of a chemical agent selected from the group consisting of an alkali metal compound, an alkaline earth metal compound, a mixture of an alkali metal compound with hypophosphorous acid and a mixture of an alkaline earth metal compound with hypophosphorous acid and the overhead from this distillation column is removed and introduced into a second distillation column at an intermediate point in said distillation column. An overhead stream from the second distillation column comprising the lower boiling components within said second distillation column is removed and is either vented or recycled to a processing column upstream from the first distillation column, while a product stream substantially free of any iodine component is removed from the lower half of the second distillation column preferably near the bottom thereof. When the feed to said first distillation column contains free iodine as indicated either by analysis or by the presence of color ranging from yellow to brown in the stream, distillation is effected in the presence of a mixture of an alkali metal compound or an alkaline earth metal compound and hypophosphorous acid. When free iodine is not present, only the alkali metal or alkaline earth metal compound is employed. Optionally, when deemed desirable, a small amount of the alkali metal or alkaline earth metal compound is introduced into the overhead from said first distillation column prior to its introduction into said second distillation column. Generally, however, this additional stream of alkali metal compound is not required except under exceptional circumstances.

BRIEF DESCRIPTION OF THE DRAWING

FIG. 1 is a diagrammatic flow diagram of the purification process of the present invention.

DESCRIPTION OF THE PREFERRED EMBODIMENTS

Reference is now made to FIG. 1 for a description of how the purification process of the present invention is carried out. The stream to be purified is introduced via line 10 into column C intermediate the ends thereof, preferably at a point near the mid-point of column C. A stream of either (1) a solution of an alkali metal or alkaline earth metal compound alone or (2) an admixture of a solution of an alkali metal or alkaline earth metal compound and a solution of hypophosphorous acid is introduced via line 11 into the feedstream of crude acetic acid entering into column C. A heavy-ends waste product, generally constituting only a few per cent of the total feed to column C, is removed via line 12 and sent to waste disposal. The heavy-ends waste product generally contains product and by-product higher boiling than acetic acid, alkali metal or alkaline earth metal iodide and other non-volatiles, and the like. An overhead stream is removed from column C via line 13 and condensed in condenser 14, the condensed stream passing via line 15 to a second distillation column D. As shown, provision can be made via line 17a to recycle part of the stream from condenser 14 back to column C to serve as reflux.

The stream entering column D via line 15 is introduced above the mid-point of this column. If desired, an additional amount of the solution of the alkali metal or alkaline earth metal compound can be introduced into the overhead stream 15 via line 16 before it enters column D. An overhead stream from column D is removed via line 17 and condensed in condenser 18, a portion being sent back to the reflux of column D via line 19 if desired and a portion of the total overhead being removed via line 20. The overhead material removed via line 20 can be either collected and disposed of or recycled back to some point upstream of column C.

The product stream from column D is removed from the lower half of column D and this can be accomplished in several ways. With valves 21 and 22 open, the main product is removed via line 23 passing through valve 21. A small bleed stream coming via line 24 through valve 22 is then recycled back to an intermediate point of column C. Alternately, valve 21 can be closed, and the entire product stream can be removed from column D through line 24 passing through valve 22. In either event, the net waste from the process is disposed of through line 12 coming from column C.

The invention is illustrated in the following examples which, however, are not to be considered as limiting it in any manner whatsoever. Unless otherwise specified all parts recited are parts by weight.

EXAMPLE 1

Acetic acid prepared by the carbonylation of methanol in the presence of a catalytic system formed on mixing of a rhodium component and an iodine component in the presence of carbon monoxide was purified in a so-called "bench unit" consisting of two distillation columns and the necessary accessory equipment. The first column, approximately one-in. in diameter, was an Oldershaw-type column having 70 trays equipped with a thermosyphon electrically-heated reboiler and a shell and tube condenser with cooling water on the tube side. The second column was also a one-in. Oldershaw-type having about 20 plates equipped with a Thiele-type thermal circulating glass reboiler with electrically heated sidearms and fittings for liquid removal and a thermowell, a liquid dividing stillhead, a glass reflux condenser and an overhead distillate cooler. A specially made draw-off joint was installed above the reboiler to withdraw product as vapor and condense it.

A stream of crude acetic acid (99+ percent) containing free iodine, ionizable iodine ($I^-$), methyl iodide and propionic acid was introduced into the first of two distillation columns at a rate of about 13 cc/minute at about the 20th tray from the bottom. Distillation was conducted at substantially atmospheric pressure with the bottoms temperature control at 120° C and the overhead temperature at 118° C. The overhead stream from the first distillation column was withdrawn, condensed in a water-cooled condenser and fed to a second distillation column at about the 5th tray from the top. The stream from the bottom of the first distillation column containing propionic acid and other higher boiling impurities was removed as a waste stream. Operating conditions of temperature and pressure in the second distillation column were essentially the same as in the first. The overhead of the second distillation column constituting about 5 percent of the total feed to this column was removed and condensed with a portion being returned to the column as reflux and the remainder being recycled to a point upstream of the purification unit. A liquid draw-off was removed from the bottom of the second distillation column through a tap water exchanger and pumped to a receiver. A vapor stream was withdrawn from the reboiler and condensed in a glass condenser at tap water temperature. The liquid product from this condenser was then pumped to the product receiver.

The system as described was operated continuously over a period of about nine days employing an acetic acid feed having a purity of at least 99 percent and containing varying concentrations of impurities depending upon operating conditions in the previous column from which the feed material originated as a bottoms stream or by reason of deliberately simulated upset conditions in this column. On the third day of operation of about 2015 hours when the total iodine content of the feed reached a level of about 1900 ppb and the stream had a deep yellow color indicative of the presence of free iodine, a stream of a solution of hypophosphorous acid in acetic acid having a concentration of approximately 3.45 percent was introduced into the first distillation column at a rate of about 6 cc/hr together with the feed stream. Operation with this chemical being added was continued for several days.

On the 7th day at 1600 hr., the reboilers on both columns were blown down, the hypophosphorous acid stream was discontinued and replaced by a stream consisting of a mixture of 0.25 M hypophosphorous acid and 1.5 M potassium acetate in acetic acid solution which was introduced into the first column at about the 10th tray from the top at a rate of 12 cc/hr while the acetic acid feed to the column was continued at a rate of about 13 cc/min. Distillation in this manner was continued for a period of about 23 hours at which time (8th day at 1625 hr), the second distillation column was shut down temporarily, both reboilers were again blown down and a 0.5 M solution of potassium acetate in acetic acid was introduced into the stream being fed to the second distillation column at a rate of 6 cc/hr. The distillation was continued with the mixed stream of hypophosphorous acid and potassium acetate still being fed to the first column until 1220 hr on the 9th day.

Samples of the feed, the overhead from the first column and the vapor product from the bottom of the second column were taken periodically and analyzed for their $I^- + I_2$ content determined as $I^-$ total inorganic iodine and for methyl iodide. Results are presented in Table I below which is annotated to reflect the changes made in operating conditions and facilitate observation of the effects of the various chemical agents mentioned above. It will be seen from an examination of these data that distillation alone could not continuously provide a product meeting an iodine specification of 40 ppb or less. Nor did the addition of hypophosphorous acid during distillation have any salutary effect on reducing iodine contamination. However, distillation in the presence of a mixture of hypophosphorous acid and potassium acetate resulted in a relatively short time in a reduction in I⁻ content in the first distillation column from around 15,400 ppb in the feed to about 1,400 ppb in the overhead, further distillation of which yielded a product from the second column containing 126 ppb I⁻ which was clear and colorless. Even further reduction in iodine content of the first column overhead as well as the second column vapor product was achieved with the further addition of potassium acetate to the feed to the second column.

TABLE I

| Day | Time, hr. | Feed comp., col. 1, ppb. | | OH comp., col. 1, ppb. | | Bottoms vapor prod., col. 2, ppb. | |
|---|---|---|---|---|---|---|---|
| | | I⁻ | MeI* | I⁻ | MeI | I⁻ | MeI |
| 1 | 0700 | 88 | 55 | >100 | 870 | >100 | 16 |
| | 1500 | 61 | 24 | >80 | 770 | >80 | 16 |
| 2 | 0700 | 77 | 31 | ≈98 | 385 | 28 | 7 |
| | 1400 | 68 | 44 | 45 | 420 | 25 | 5 |
| | 2300 | 460 | 69 | 57 | 900 | 11 | 4 |
| 3 | 0700 | >1,000 | 125 | >100 | 950 | >100 | 8 |
| | 1005 | 1,900 | | ≈1,100 | | 260 | |

Hypophosphorous acid added at 2015 hr.

| | 2300 | >900 | 74 | 560 | 620 | 65 | 5 |
|---|---|---|---|---|---|---|---|
| 4 | 0700 | >900 | 200 | >900 | 550 | >900 | 9 |
| | 1500 | 8,200 | 231 | ≈11,400 | | 3,900 | 14 |
| | 2300 | 600 | 114 | 2,500 | 2,500 | 2,200 | 11 |
| 5 | 0700 | 2,400 | 123 | 6,800 | 640 | 2,500 | 10 |
| | 1500 | 10,400 | 220 | 11,600 | 860 | 2,700 | 23 |
| | 2300 | 10,900 | >240 | ≈12,300 | 710 | 3,750 | 32 |
| 6 | 0700 | 7,600 | 160 | ≈11,700 | 470 | 4,600 | 22 |
| | 1500 | 9,700 | 162 | >9,700 | 520 | 4,400 | 24 |
| 7 | 2300 | 9,900 | 280 | 12,600 | 990 | 5,100 | 36 |
| | 0700 | 12,500 | 192 | 13,700 | 913 | 5,900 | 168 |

Potassium acetate added with hypophosphorous acid at 1600 hr.

| | 1930 | >9,700 | 360 | 1,700 | 500 | 126 | 18 |
|---|---|---|---|---|---|---|---|
| 8 | 0700 | 15,400 | 418 | 1,400 | 418 | Shutdown | |
| | 1500 | >9,700 | 946 | 600 | 484 | | |

Potassium acetate added to feed to second column 1625 hr.

| | 2300 | 16,300 | | 605 | 462 | 36 | 4 |
|---|---|---|---|---|---|---|---|
| 9 | 0700 | 16,800 | | 363 | 803 | 121 | 5 |
| | 1200 | 14,600 | >240 | 363 | 616 | 8 | |

*Methyl iodide.

EXAMPLE 2

A stream of acetic acid was purified using the distillation unit represented in FIG. 1 and described above wherein column C contained approximately 70 trays and column D had 22 trays. Acetic acid (99+ percent) containing approximately 0.1 percent propionic acid, 134 ppb I⁻ and 5 ppb methyl iodide was fed at a rate of 3900 parts/hr through line 10 into column C. A stream of 50 percent aqueous hypophosphorous acid and a stream of 50 percent aqueous potassium acetate were introduced into the acetic acid feed stream via line 11 at rates of 0.07 part/hr and 0.71 part/hr, respectively. Column C was operated at a bottom temperature of 240° F, an overhead temperature of 235° F and at approximately atmospheric pressure. The product leaving the bottom of column C through line 12 containing propionic and other higher acids and other unidentified high-boilers was sent to waste facilities for disposal. The overhead stream leaving the column through line 13 and being introduced into column D through line 15 after passing through water condenser 14 contained from 2.4 – 4 ppb I⁻ and 13.2 ppb methyl iodide. A part of the condensed OH stream (75 percent) was returned to column C as reflux via line 17a.

Column D was operated at bottom and overhead temperatures and a pressure approximately the same as those of column C. Approximately 5 percent of the total feed to column D was removed overhead and condensed, a portion of the condensate being returned through line 19 to the column as reflux and the remainder being recycled to a point upstream of column C via line 20. The product stream of acetic acid removed from column D through valve 21 and line 23 as a vapor and condensed contained 3.6 ppb I⁻ and 0.5 ppb methyl iodide. Approximately 94 percent by weight of the total feed to column D was removed as the product stream. A waste stream comprising approximately 1 percent by weight of the total feed to column D was removed from the bottom of the column and recycled through line 10 to column C. This stream contained acetic acid and a small amount of solid material identified as metal corrosion products and other non-volatile materials.

EXAMPLE 3

Using the same equipment and operating in the manner described in Example 1, approximately 0.07 part/hr of 50 percent hypophosphorous acid and 0.5 part/hr of 50 percent aqueous potassium acetate were introduced into column C at tray 46 in the upper section while about 0.71 part/hr of 50 percent aqueous potassium acetate were introduced through line 11 into the acetic acid feed stream 10 being charged at about 3900 parts/hr and containing 99+ percent acetic acid, 0.1 percent propionic acid, 193 ppb I⁻ and 10 ppb methyl iodide. Distillation under these conditions gave an acetic acid overhead product from column C containing <1 ppb I⁻ and 13 ppb methyl iodide and an acetic acid product from the bottom of column D containing 3 ppb I⁻ and <1 ppb methyl iodide. During this test period the system was known to be loaded with free iodine ($I_2$), rates were being changed and temperature control in the column preceding column C was erratic. Despite these adverse conditions, the acetic acid product consistently remained within the specifications calling for <40 ppb iodine.

EXAMPLE 4

In this test, 50 percent aqueous hypophosphorous acid and 50 percent aqueous potassium acetate were introduced into column C on tray 46 at rates of 0.07 part/hr and 0.71 part/hr, respectively, while the crude acetic acid containing 135 ppb I⁻ and 5 ppb methyl iodide was fed at the same rate as in the previous examples through line 10. Distillation conditions were the same as in the previous examples. The overhead from column C contained 2.2 – 6.4 ppb I⁻ and 5 ppb methyl iodide while the acetic acid product from column D contained 3 ppb I⁻ and 1.1 ppb methyl iodide.

EXAMPLE 5

Acetic acid containing 1267 ppb I⁻ and 20 ppb methyl iodide was purified as in the manner described in the previous examples with 0.7 part/hr of 50 percent aqueous hypophosphorous acid and 0.71 part/hr of 50 percent potassium acetate being introduced into column C at tray 46 and 0.71 part/hr of 50 percent aqueous potassium acetate also being introduced through line 11 into the crude acetic acid feed stream being fed through line 10 at 3900 parts/hr. Despite the high I$^-$ content of the feed acid to column C, the overhead product from this column contained only 1.0 ppb I$^-$ and 34 ppb methyl iodide while the purified acetic acid product also contained only 1 ppb I$^-$ and 32 ppb methyl iodide.

EXAMPLE 6

During three separate periods of distillation, no chemical agents were introduced into either column C or column D. In the first of these, a six-hour run, the feed to column C contained 6000 ppb I$^-$ when the chemicals were turned off. Within several hours, the overhead from column C went from <1 ppb to 3500 ppb I$^-$ and the I$^-$ in the product from column D increased from <1 to 10 ppb. In a second period of operation without chemical agent addition, the overhead in column C went from less than 1 ppb I$^-$ to 228 ppb I$^-$ in four hours and the acetic acid product from column D rose from <1 ppb I$^-$ to 27 ppb I$^-$ in the same period. Similar results were obtained in the third period of operation without the addition of any chemical agents to either column C or column D when the I$^-$ content of the overhead from column C increased approximately fourfold in five hours (to 243 ppb I$^-$ from 66 ppb I$^-$) and the product acetic acid from column D increased from 6 to 16 ppb I$^-$ during the same period.

EXAMPLE 7

During a distillation conducted as in the previous examples when no free iodine was present in the system, only potassium acetate was added to the system via the crude acetic acid feed stream to column C at a rate of about 0.71 part/hr. All hypophosphorous acid addition was discontinued. The overhead from column C contained <1 ppb I$^-$ although the feed introduced into the column contained 250 ppb I$^-$. The product acetic acid from column D likewise contained <1 ppb I$^-$.

EXAMPLE 8

Acetic acid containing 800 ppb I$^-$ and 11 ppb methyl iodide was purified in the manner described in the Example 7 except that 0.41 part/hr of 25 percent aqueous potassium hydroxide was introduced into the feed stream 10 to column C instead of potassium acetate. The overhead from column C resulting from this operation contained only 11 ppb I$^-$ and 15 ppb methyl iodide while the product acetic acid stream from column D contained 1.2 ppb I$^-$ and 1.2 ppb methyl iodide.

As will be clear from the above examples, iodine contamination in acetic acid can be reduced to exceedingly low concentrations so as to provide acid of such extremely high purity that it can be employed as a raw material essentially for all purposes. The invention is, of course, not to be considered as being limited to that specifically set forth in the examples. Any type distillation column, for instance, normally used for separation and purification can be employed as the first column in the distillation system and it can be of either the packed or plate type or a combination of the packed-plate type. Generally, the first distillation zone will comprise a plate-type column having from 45 to 80 and preferably 60 to 75 trays and in an especially preferred embodiment employs sieve trays although other type trays such as bubble cap and ballast may be employed.

The second distillation column like the first one can comprise any distillation column normally employed for the separation and purification of fluids. It also can be of the packed or plate type or a combination of the two. Generally, the second distillation column will comprise a plate-type column having from 2 to 30 and preferably 5 to 25 trays. Although bubble cap trays and ballast trays may be employed in the column comprising the second distillation column, it is preferred that sieve trays be used.

The temperatures and pressures employed in the two distillation columns may vary considerably. As a practical matter, these columns are most often operated at pressures of from approximately atmospheric to 50 psig though subatmospheric pressures may be employed if desired as well as superatmospheric pressures well in excess of 100 psig, Preferably, however, in the purification of acetic acid, the two distillation columns are usually operated at pressures within the range of 0 to 25 psig.

Temperatures within the columns will normally be between the boiling point of the acetic acid being purified at the pressure of the column and the temperature at which a satisfactory boil-up rate is achieved at such pressure. At the preferred pressures, the bottoms temperatures of the two columns generally will be within the range of from approximately the boiling point of the acid at the pressure employed to as high as 400° F and higher. Preferably, however, these bottoms temperatures are maintained below 325° F. The temperatures at the top of the distillation columns may be the same or different but most often, the distillation column temperatures and pressures of the two columns are approximately the same.

While the point of introduction of the feed stream to the first distillation column can vary intermediate the ends of the column, the feed stream usually is introduced near the mid-point of the column and preferably into the middle third. The stream fed to the second distillation column which is removed as an overhead stream from the first distillation column is preferably in the liquid state.

The feed to the second distillation column also can be introduced anywhere intermediate the ends thereof. Generally, this feed is introduced into the upper half of this second column. It is preferred, however, that the feed to the second distillation column be introduced into the upper one-third of the column. The product stream removed from the second distillation column can be removed from any point in the lower half of the column depending on the desired degree of purity of the product. However, it has been found preferable that the product stream be removed from the lower quarter and even more desirably from the lower one-tenth of the column. A product having minimum iodine contamination can be achieved by taking a bottom stream from the second distillation column. Therefore, if maximum purity, in terms of the iodine content, is desired, a bottom stream is taken. This has the slight disadvantage that some small amount of metallic impurities may be taken in the bottom stream along with the desired product. However, this may be offset by the reduced amount of iodine contaminants which frequently poses a more serious problem as an impurity in subsequent processes utilizing the product from the process of the present invention than do the metallic impurities. By taking the product stream from a point adjacent to but not at the bottom of the distillation column such as just below the first distillation tray, a small sump for these metallic impurities is formed from which they may be periodically drained.

The percentage of the total feed to the second distillation column removed as an overhead fraction from such column can vary somewhat. Generally, however, the overhead stream removed from the second distillation column will range from 0.5 to 20 percent by weight, preferably 1 to 10 percent by weight, of the total feed to the second distillation column. Removal of an amount within these ranges, particularly the narrower range, ensures maximum removal of the light iodide impurities produced in the first distillation column. As was stated, this overhead stream from the second distillation column can either be collected and disposed of or recycled to a point upstream of the first distillation column.

The percentage of the total feed to the second distillation column which leaves as the purified acetic acid product stream will generally range from 80 to 99 percent by weight, preferably 93 to 98 percent by weight. When the product stream is a side draw from above the bottom tray of the distillation column to permit metallic impurities to be collected on the bottom of the column, a bottom stream comprising from 1 to 5 percent by weight of the total feed to the second distillation column and containing the metallic impurities, is removed from the bottom of the second column and usually is recycled back to the first distillation column.

Potassium compounds are preferred for use as the chemical agents either in conjunction with hypophosphorous acid or separately. In addition to the potassium acetate and potassium hydroxide exemplified, however, other suitable chemical agents for use in the practice of the process of the invention include the oxides, hydroxides, carbonates, bicarbonates and salts of weak organic acids of both the alkali metals in general such as sodium, rubidium and cesium and the alkaline earth metals such as calcium, barium and strontium. The acetates are the particularly preferred compounds although the hydroxides represent more economical operation. When the hydroxides are employed, care should be taken to see that the chloride level in these materials as, for example, in sodium hydroxide, is less than 1 percent. Any concentration of the added chemical agent in the bottoms from the first distillation column could lead to a build-up of the chloride ion which could in turn result in severe corrosion problems.

In general, the amount of chemical agent to be added is an amount in stoichiometric excess of the amount of ionic iodine and free iodine present in the acid being purified. Preferably, in view of the minute quantities of impurities which can be removed by the process of the present invention, a 1000-fold excess is employed. When a mixture of both the alkali metal or alkaline earth metal compound and hypophosphorous acid is employed, the excess of the alkali metal or alkaline earth metal compound is determined on the basis of the ionic iodine present in the acetic acid being purified while the excess of the hypophosphorous acid in the mixture is determined on the basis of the free iodine content of the acetic acid being purified. The simplest qualitative indication of the presence of $I_2$ which requires the addition of hypophosphorous acid is the characteristic yellow color it attributes to the stream which increases in intensity toward a brown coloration as the concentration of free iodine increases. As a matter of convenience, the chemical agent is introduced either as an aqueous solution of about 50 percent concentration in the case of the alkali metal or alkaline earth metal salts and 25 – 75 percent concentration of the hydroxides. The hypophosphorous acid is likewise conveniently employed as a 50 percent aqueous solution although it can be added in any desired concentration. However, solutions of the chemical agent in acetic acid can also be employed. The location at which the chemical agent is introduced into the column is not critical. As is readily apparent from the examples, the acid and/or the alkali metal or alkaline earth metal compound can be introduced with the feed acid to be purified or on any tray above the feed tray in the first distillation column or, for that matter, it can be added to the bottom stream from the previous column in the purification train which becomes the feed to the first distillation column in the present system. A very convenient point of addition is the suction of the pump to the first distillation column. This pump is usually at grade level and provides excellent mixing of the chemical agent with the feed stream prior to entry into the first distillation column.

As will be recognized, various pumps, compressors, reboilers, etc., normally employed in carrying out chemical distillation processes can be employed in the process herein. Since these do not form part of the invention, details of their use in various phases of the process description have not been included.

What is claimed is:

1. A process for the removal of very minor amounts of iodine from acetic acid which comprises introducing an acetic acid stream containing very minor amounts of iodine into a first distillation column intermediate to the ends thereof, introducing into said first distillation column intermediate to the ends thereof a chemical agent selected from the group consisting of mixtures of the oxides, hydroxides, carbonates, bicarbonates and salts of weak organic acids of the alkali metals and alkaline earth metals and hypophosphorous acid, removing a product stream overhead from said first distillation column, introducing said product stream into a second distillation column intermediate the ends thereof, removing an acetic acid stream substantially free of said iodine from the lower part of said second distillation column, and removing an overhead fraction containing iodine from said second distillation column.

2. The process of claim 1 wherein said stream of acetic acid is introduced into the middle third of said first distillation column, said stream of chemical agent is introduced into said acetic acid stream, and said overhead stream from said first distillation column is introduced into the upper half of said second distillation column.

3. The process of claim 1 wherein said stream of acetic acid is introduced into the middle third of said first distillation column, said stream of chemical agent is introduced into the upper half of said first distillation column, and said overhead stream from said first distillation column is introduced into the upper half of said second distillation column.

4. The process of claim 2 wherein said chemical agent is a mixture of said alkali metal compounds and hypophosphorous acid.

5. The process of claim 4 wherein said chemical agent is a mixture of potassium acetate and hypophosphorous acid.

6. The process of claim 4 wherein said chemical agent is a mixture of potassium hydroxide and hypophosphorous acid.

7. The process of claim 4 wherein the amount of said alkali metal compound employed is in stoichiometric excess of the amount of ionic iodine in the acetic acid stream being introduced into said first distillation column and the amount of hypophosphorous acid is in stoichiometric excess of the amount of free iodine in the acetic acid stream being introduced into said first distillation column.

8. The process of claim 5 wherein the amount of potassium acetate employed is in stoichiometric excess of the amount of ionic iodine in the acetic acid being introduced into said first distillation column and the amount of the hypophosphorous acid is in stoichiometric excess of the amount of free iodine in the acetic acid stream being introduced into said first distillation column.

9. The process of claim 6 wherein the amount of potassium hydroxide employed is in stoichiometric excess of the amount of ionic iodine in the acetic acid stream being introduced into said first distillation column and the amount of hypophosphorous acid is in stoichiometric excess of the amount of free iodine in the acetic acid being introduced into said first distillation column.

* * * * *